United States Patent [19]
Garrigues et al.

[11] Patent Number: 5,643,444
[45] Date of Patent: Jul. 1, 1997

[54] DEVICE FOR FILTERING A LIQUID, PARTICULARLY WATER

[75] Inventors: Patrick Garrigues, Pierrefitte-Nestalas; Luc Gabette, Boo-Silhen; Jean-Paul Astegno, Espoey, all of France

[73] Assignee: SEB S.A., Selongey, France

[21] Appl. No.: 370,385

[22] Filed: Jan. 10, 1995

[30] Foreign Application Priority Data

Jan. 10, 1994 [FR] France .................. 94 00342

[51] Int. Cl.6 .................................. B01D 24/16
[52] U.S. Cl. ................... 210/136; 210/266; 210/282; 210/416.3
[58] Field of Search .................... 210/136, 266, 210/282, 503, 257.1, 258, 416.3

[56] References Cited

U.S. PATENT DOCUMENTS

| | | | |
|---|---|---|---|
| 3,420,709 | 1/1969 | Barrett et al. | 210/503 |
| 3,950,253 | 4/1976 | Stern | 210/282 |
| 4,717,476 | 1/1988 | Scott | 210/266 |
| 4,741,828 | 5/1988 | Alhauser et al. | 210/282 |
| 5,066,393 | 11/1991 | Padera et al. | 210/136 |
| 5,092,990 | 3/1992 | Muramatsu et al. | 210/136 |
| 5,290,442 | 3/1994 | Clack | 210/282 |
| 5,362,385 | 11/1994 | Klegerman et al. | 210/136 |

OTHER PUBLICATIONS

*Water Treatment Handbook*, Degremont, 1991, vol. 1, p. 156.

*Primary Examiner*—Ivars Cintins
*Attorney, Agent, or Firm*—Loeb & Loeb LLP

[57] ABSTRACT

Apparatus for filtering liquids, the apparatus including: a reservoir for the liquid to be purified; a pump operatively associated with the reservoir; a filter having a lower portion and an upper portion and coupled to the pump so that liquid supplied by the pump circulates through the filter from the lower portion to the upper portion; a dispensing member coupled to the filter for dispensing purified liquid; and a one-way valve connected upstream of the filter, with respect to the direction of liquid flow in the apparatus, and operable to maintain the filter in permanent contact with liquid to be purified when the pump is not in operation.

20 Claims, 3 Drawing Sheets

DEVICE FOR FILTERING A LIQUID, PARTICULARLY WATER

BACKGROUND OF THE INVENTION

The present invention relates to the general technical field of the filtration of fluids, and in particular water, by passage of the fluid to be treated through a substrate whose physico-chemical properties assure the treatment of impurities contained in the fluid.

The present invention concerns, more specifically, a device for purifying fluids, and particularly but not exclusively an apparatus for filtering water, comprising a reservoir for fluid to be treated associated with a pump means adapted to cause the fluid which is to be treated to be circulated through a filtration means from the lower part of that means toward its upper part, and then to an element for dispensing the treated fluid.

It is already known to purify fluids, in particular drinking water, by passage of the water on a substrate which assures a filtration having an physico-chemical character.

Thus, U.S. Pat. No. 3,950,253 discloses a domestic water purification apparatus comprising a reservoir for water to be treated and in which is disposed a filter cartridge intended to assure the treatment and purification of the water. The apparatus also includes a pump adapted to pump the water to be treated in order to direct it, through the intermediary of a tubing, toward the bottom of the filter cartridge in a manner to cause the water which is to be treated to circulate in the cartridge from the bottom to the top. The water, after having been treated and purified, thus exits the upper part of the filter cartridge via a dispensing tube whose end opens into a stationary receptacle integrated into the body of the purification apparatus.

The constituent materials of the filter cartridge are constituted, in a manner known per se, of a mixture of activated carbon with a silver salt additive to combat bacterial growth, and ion exchange resin. Various other constituents can be added to the filter cartridge when specific impurities are present in the water to be treated.

Such an apparatus provides a non-negligible solution to the specific problem of purification and treatment of water for domestic use in a given environment. Running water can, in effect, be rid, entirely or in part, by the expedient of the filter cartridge, of the principal contaminating agents of the organic or inorganic types such as chlorine, lead, pesticides, heavy metals, nitrates, etc., which are the cause of disagreeable flavors, odors or colors.

It has been found, however, that the purification of water in such an apparatus is not effected in a complete manner, regardless of the nature and quality of the composition forming the filter cartridge. In effect, one observes particularly a progressive diminution in time of the effectiveness of the purification linked at the same time to the progressive plugging of the filter cartridge on the one hand, and to a diminution of the intrinsic effectiveness of the cartridge because of a decrease in its biologic activity, on the other hand. Such a decrease in activity can be related to the vertical position of the filter cartridge leading, during periods of non-use, to a progressive drying of the filter cartridge by evacuation of the water under the influence of gravity. It must be equally noted that the mounting of the filter cartridge at the very interior of the reservoir of liquid which is to be treated renders the operation of replacing the filter cartridge difficult, such a replacement necessitating moreover a series of difficult manipulations which multiply the zones of contact between the hands of the user and the apparatus. As a result, it becomes difficult to completely master the state of cleanliness of the apparatus and to effectively battle against the development of concentrations of bacteria in zones which are difficult to clean.

SUMMARY OF THE INVENTION

It is an object of the present invention to remedy the various problems mentioned above, and in particular to provide an apparatus for purifying fluids, in particular water, whose filtration efficiency is improved in a durable manner for the entire useful life of the filter cartridge with the aid of particularly simple means.

Another object of the invention is to provide a fluid purification apparatus in which the efficiency and activity of the filter cartridge is improved and whose useful life is prolonged.

Another object of the invention is to provide such an apparatus in which the maintenance of the filter cartridge in a moist condition is obtained with the aid of particularly simple means which do not have a negative influence on the desired flow of fluid through the cartridge.

Another object of the invention is to furnish apparatus of this type in which the passage of the fluid through the filter cartridge is homogenous.

Another object of the invention is to provide such an apparatus which is constructed to facilitate replacement of the filter cartridge without excessive manipulations and without risk of bacterial contamination.

Another object of the invention is to provide such an apparatus in which the distribution of the treated fluid is facilitated and capable of being adapted to different types of receptacles.

The above and other objects are achieved according to the invention, by apparatus for filtering liquids, the apparatus comprising:

a reservoir for the liquid to be filtered;

liquid pumping means operatively associated with the reservoir;

filter means having a lower portion and an upper portion and coupled to the pumping means so that liquid supplied by the pumping means circulates through the filter means from the lower portion to the upper portion;

dispensing means coupled to the filter means for dispensing filtered liquid; and a one-way valve connected upstream of the filter means, with respect to the direction of liquid flow in the apparatus, and operable, when the pumping means are not in operation, to maintain the filter means in permanent contact with liquid previously supplied by the pumping means.

DESCRIPTION OF THE PREFERRED EMBODIMENTS

Figure 1:
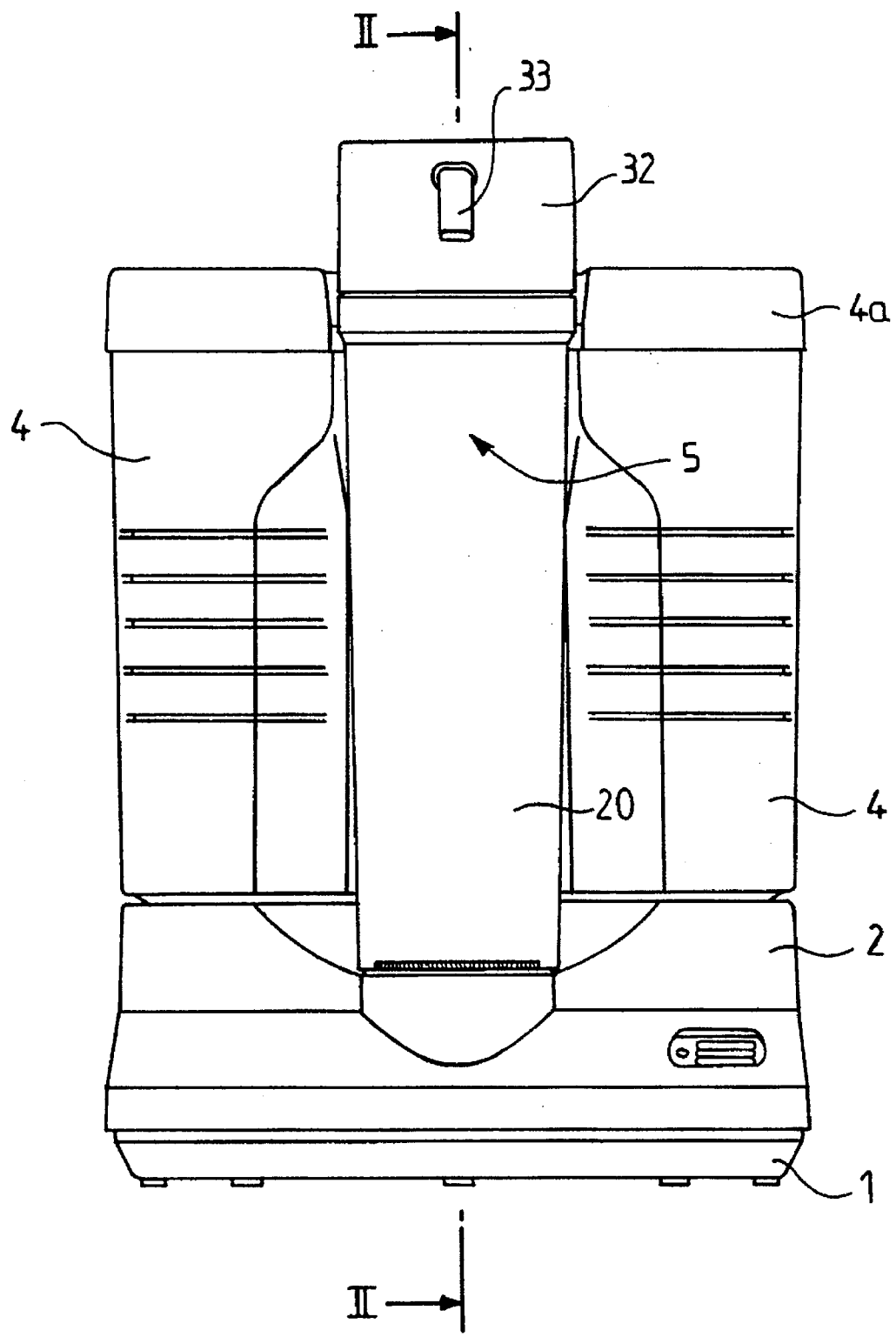
FIG. 1 is a front elevational view of one embodiment of apparatus for filtering liquids according to the invention.
Figure 2:
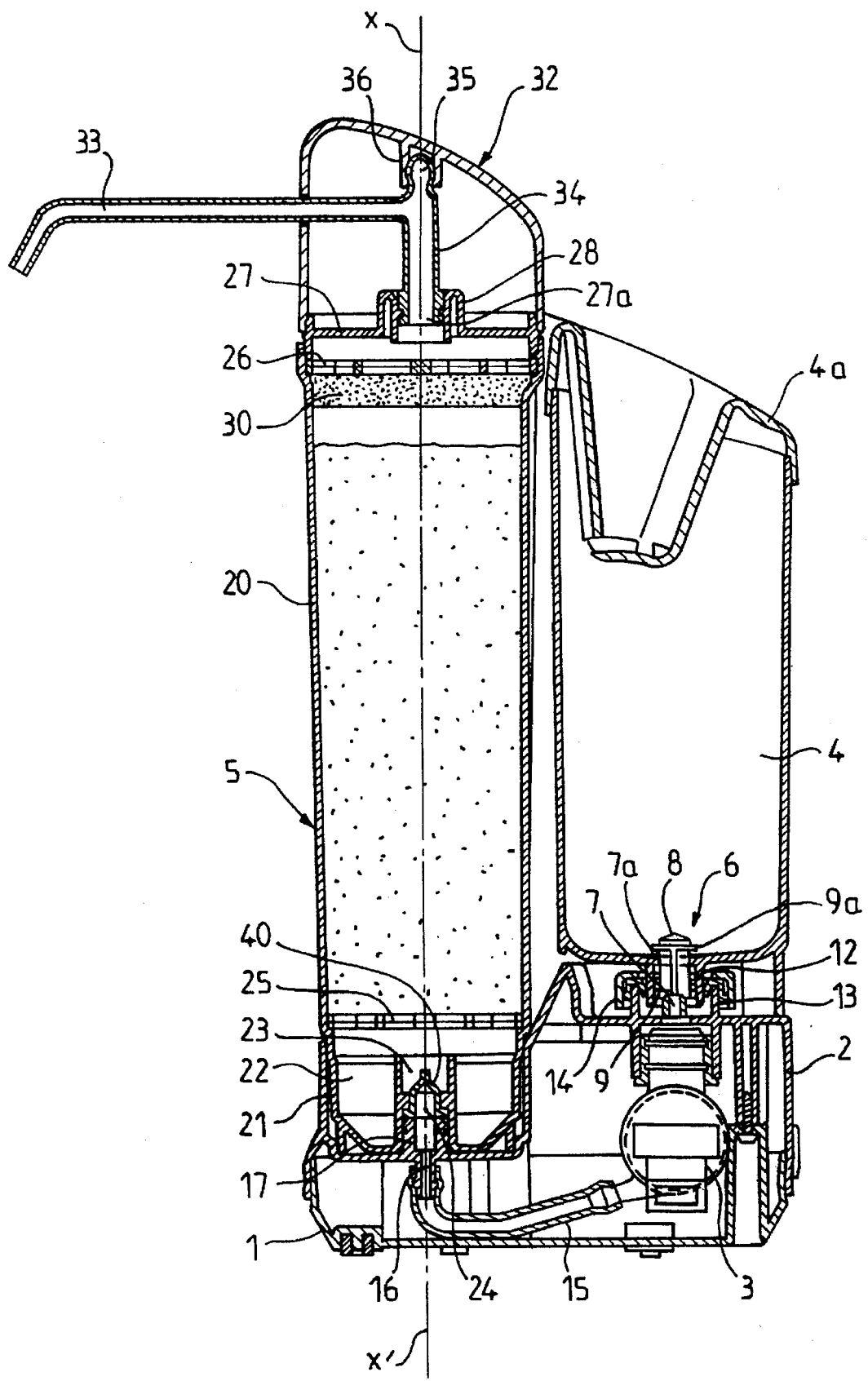
FIG. 2 is a cross-sectional view taken along the line 2—2 of FIG. 1.

FIG. 1 shows in a general manner a preferred embodiment of an apparatus for filtering liquids according to the invention, the illustrated embodiment being an apparatus for purifying water for domestic use. The apparatus for filtering water includes a main stand or support made of plastic and including a base 1 on which is mounted a cover 2 defining with base 1 the lower part of the apparatus. As can be seen in FIG. 2, the lower part of the apparatus contains a pumping means 3 constructed to produce an operating pressure which causes the liquid to be purified to be circulated from a storage reservoir 4 toward a filter means 5.

Reservoir 4 is preferably removable, is disposed at least in part at the rear of the main housing of the apparatus and is connected by a connection system 6 to a delivery orifice 7 via which liquid is withdrawn from the interior of reservoir 4 by pumping means 3. Connection system 6 includes, in a known manner, a valve 8 mounted to be elastically movable through the intermediary of a spring 9 in a perforation 7a in the bottom of reservoir 4. Valve 8 is provided with a sealing joint, or ring, 9a and is mounted in a manner to disengage from perforation 7a when reservoir 4 is fixed on the main housing of the apparatus through the intermediary of connection system 6. In this position, perforation 7a is substantially in line with orifice 7 in order to permit the liquid to be treated to be drawn by pumping means 3. The assembly of reservoir 4 on the housing of the apparatus is effected by the insertion of a circular skirt 12, surrounding perforation 7a and extending downwardly away from the base of reservoir 4, into a guide collar 13 having a diameter larger than that of skirt 12 and extending in the direction toward reservoir 4, starting from cover 2. Collar 13 can be provided with a sealing joint, or ring, and with a joint cover 14 covering the sealing joint. When reservoir 4 is withdrawn by the user, the elastic mounting of valve 8 permits sealing ring 9a to reliably seal perforation 7a in the bottom of reservoir 4 so that water remaining in reservoir 4 cannot escape therefrom.

According to a modification of the preferred embodiment, reservoir 4 is closed at its upper end by a protective cover 4a, which is preferably removable and is provided with an opening via which reservoir 4 can be refilled with liquid without removing cover 4a.

Pumping means 3 is constituted by a motor-pump group supplied with electric power, preferably at a low voltage, and capable of assuring an average pumping flow of the order of one liter per minute and of being varied between 0.8 and 1.2 liters per minute. Pumping means 3 is disposed within the internal volume defined by base 1 and cover 2 and is connected by a tube 15 to an outlet orifice 16 formed in cover 2, preferably substantially at the front face of the housing of the apparatus and in line with the location reserved for the filter means 5. Outlet orifice 16 is surrounded at the outside of cover 2 by a cylindrical guide skirt 17 which forms an integral part of cover 2.

Filter means 5 is constituted by a cartridge 20 having a substantial cylindrical form and mounted to be oriented substantially vertically on the principal housing of the apparatus. Cartridge 20 is adapted to be mounted in a removable manner on the apparatus. The lower part 21 of cartridge 20 is constituted by a circular envelope delimiting a decanting chamber 22 provided in its internal central part with a well 23, preferably circularly cylindrical, opening to the exterior via an inlet 24. Mounting of cartridge 20 on the principal housing of the apparatus is effectuated by forcefully plugging a lower part 21 into a bowl formed in cover 2, and then by bolting with the aid, for example, of a bayonet locking system, well 23 being aligned with outlet orifice 16 and the walls of well 23 coming to bear on and surround skirt 17.

As a result of this mounting, cartridge 20 is disposed in a removable manner at the exterior of the principal housing, which facilitates its gripping and replacement.

Cartridge 20 includes, from bottom to top, a lower filter plate 25, for example of polypropylene and having a pore size of 20 microns, and an upper filter plate 26 of the same composition and pore size, situated in the upper part of cartridge 20. The upper part of cartridge 20 is further provided with a closing cover 27 which is formed to have an opening 27a that is in the form of a perforated central column 28.

Filter plates 25 and 26 are particularly intended to effectuate a mechanical filtration of the largest particles to be removed from the water, while the central internal volume of cartridge 20, extending between plates 25 and 26, is filled with a filter composition based on a mixture of activated carbon, ion exchange resins and metallic particles charged for preferentially treating agents responsible for the taste and the odor of water. The filtering composition is also intended to assure treatment of certain heavy metals and pesticides and to eliminate chlorine, the anionic resin being more particularly selected to eliminate nitrate based compounds. By way of example, cartridge 20 will contain around 240 cc of anionic resin and 175 cc of activated carbon in grains ground with silver and 85 cc of metal particles having a base of copper and/or of zinc, for example. Any other suitable filter composition can be used.

Advantageously, it is also possible to interpose between the filtering composition and upper filter plate 36, a disk 30 of a foam material whose principal function is to limit plugging of plate 26, which is situated downstream of disk 30.

By way of modification, it is also possible to provide for incorporating an anti-tartar, or demineralizing, means in the apparatus and in particular in cartridge 20 itself. This means can be a series of vitreous polyphosphate beads, disposed in the upper part of cartridge 20 and progressively and regularly liberating, when in contact with the water, polyphosphates to obtain a total phosphorous concentration ($P_2O_5$) of between 0.3 and 12 milligrams per liter, and preferably between 1 and 5 milligrams per liter.

The upper terminal extremity of cartridge 20 is constituted by a cap 32 provided with a dispensing tube 33 opening at the exterior of cap 32 and including a connection branch 34 mounted for rotation on column 28. As shown in FIG. 2, branch 34 is seated and supported for rotation around the main axis x–x' of cartridge 20, the branch being fixed to cap 32 by an upper guide element 35 firmly anchored in a housing 36. Cap 32 and tube 33 thus constitute an orientable dispensing means.

The apparatus for purifying fluids according to the invention also includes a one-way valve 40 for controlling the flow of fluid to be treated. Valve 40 is disposed in a flow conduit upstream of filter means 5, with respect to the direction of circulation of the fluid to be purified, in a manner to leave the filter means in permanent contact with fluid to be treated when pumping means 3 are not in operation.

In a particularly advantageous manner, valve 40 is of a mechanical type, i.e., a displacement type, mounted at inlet 24 of filter means 5 in a fluid flow conduit, and preferably in decanting chamber 22. In a particularly advantageous embodiment of the invention, valve 40 is mounted in central well 23.

According to an alternative example, valve 40 can also be mounted at one of the two extremities of tube 15.

Figure 3:
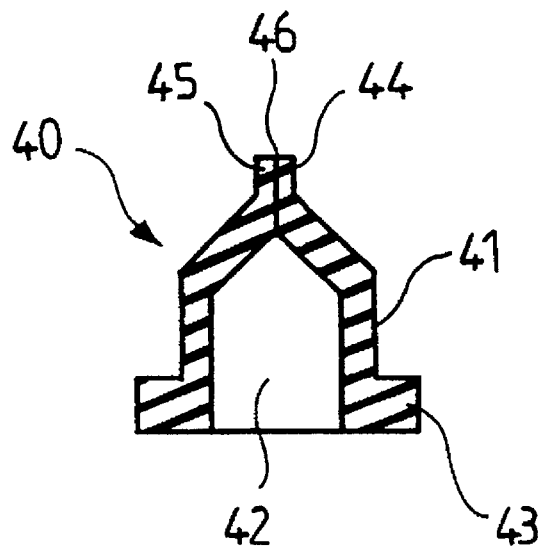
FIG. 3 is a cross-sectional view of a one-way valve employed in the embodiment of FIGS. 1 and 2.
Figure 4:
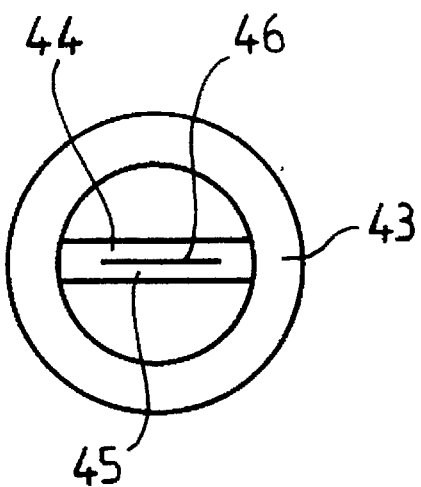
FIG. 4 is a top plan view of the valve shown in FIG. 3 in its closed position.
Figure 5:
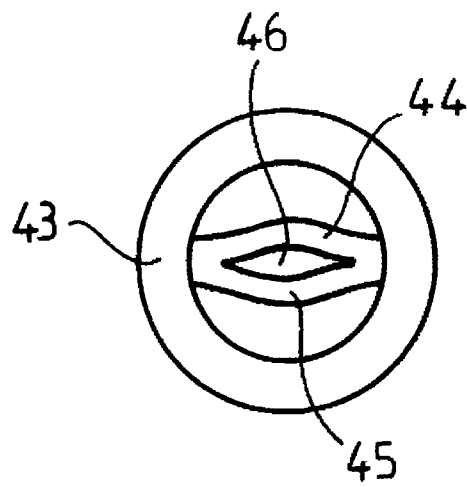
FIG. 5 is a view similar to that of FIG. 4, showing the valve in its open position.

As shown in FIGS. 3–5, valve 40, made of a deformable plastic material such as silicone of a quality suitable for use with foods, is presented in the form of a main hollow body 41 which is substantially cylindrical and forms a fluid inlet chamber 42. The lower extremity of chamber 42 is provided with an external annular collaret, or flange, 43.

Valve 40 also includes, in the part of hollow body 41 which is opposed to flange 43, a frustoconic zone terminating by two elastic lips 44, 45 defining a narrow portion of the fluid flow path. Lips 44 and 45 are closed against one another in order to block fluid flow in their rest position, while defining between themselves a slit 46 through which fluid may flow when lips 45 and 46 are spaced apart from one another. According to a particular advantageous mounting arrangement, valve 40 is oriented substantially vertically in alignment with orifice 16 and inlet 24 forming a flow conduit, in well 23 and is maintained in place by compression of flange 43 in a housing defined between skirt 17 and outlet orifice 16. Valve 40 is mounted so that fluid can flow therethrough in its normal direction of flow, from pump means 3 to the interior of cartridge 5. When being pumped in this direction by pumping means 3, the pressure of the liquid will separate the walls of the frustoconic zone, and will then move lips 44 and 45 away from one another, into the position shown in FIG. 5.

Valve 40 is thus deformable between an elastic rest position in which the flow path is closed in a hermetically sealed manner when pumping means 3 is not in operation, and an open position in which the flow conduit is open when pumping means 3 is in operation. In effect, the fluid flow pressure in chamber 42 is sufficient to exert a pressure on lips 44, 45 which permits opening (FIG. 5) of slit 46. In contrast, when pumping means 3 is not in operation, lips 44 and 45 return naturally to their elastic rest position corresponding to a hermetically closed condition of slit 46 (FIG. 4). The one-way valve formed by lips 44, 45 is also referred to in the art as a duck bill.

Alternatively, it is possible to use other types of one-way valves, including mechanical types such as spring-loaded valves, movable between two predetermined positions, by rotation, sliding, etc. According to one alternative embodiment (not shown), valve 40 will be composed of a ball which is held under the influence of gravity and in a sealing manner on a seat arranged in well 23 or in base 1 at the level of inlet 24. It is also possible to mount electrically controlled valves, such as solenoid valves.

The operation of apparatus for purifying liquids according to the invention is the following.

After having filled reservoir 4 with fluid to be treated, for example water coming from a water mains, the user turns on pumping means 3 which causes the water to flow under the normal operating pressure of pumping means 3. Turning on of pumping means 3 can be effected in the conventional manner by operating an on-off switch. Such switch is preferably provided with a security device, such as an auto shut-off. The water passes at a flow rate, for example, of the order of 0.8 to 1.2 liters per minute, from reservoir 4 and through tube 15 in order to reach chamber 42. The pressure exerted on the internal faces of lips 44 and 45 permits opening of slit 46 and the passage of water to be treated into the upper part of well 23 and then into decantation chamber 22, which becomes filled with water. During the course of the filling of decantation chamber 22, the largest solid particles in the water can become deposited at the bottom of the chamber, the progressive filling of the latter also permitting a homogeneous distribution of the flowing water to be treated throughout the entire cross-section of cartridge 20. Such a distribution presents the advantage of preventing, in lower part 21 of cartridge 20, preferential flow paths, for the water being treated, through the filtering material. By avoiding such preferential flow paths, the quality of the resulting purification treatment is improved. The water to be purified then follows its path through the entire cross-section of cartridge 20 up to the upper part of the cartridge and then flows through tube 33 into a recovery receptacle (not shown).

When the user has obtained the desired quantity of purified and filtered water, he stops operation of pumping means 3. As a result, the pressure acting on the water is interrupted and valve 40 is allowed to close immediately and automatically, lips 44 and 45 assuming their elastic rest position corresponding to the closing of slit 46, as illustrated in FIG. 4. The entire column of water thus trapped in tube 33 and its connection branch 34, as well as in cartridge 20, can then remain in place, the filtering composition being maintained constantly, when pumping means 3 is not in operation, in a humid condition.

It has been found that when the filtering materials are maintained in a constant moist condition, various ingredients of the filtering composition can better retain a good efficiency, which assures an improved filtering yield. Moreover, the use of a one-way valve 40 which is mechanically deformable simply in response to the pressure of the water represents a very simple technical solution, is inexpensive and has a high degree of operating reliability and durability.

By way of example, the Shore hardness of the material constituting valve 40 can be of the order of 40±5.

According to a modified version of the invention (not shown), cover 27 is present in the form of a conic frustum defining, starting from column 28, walls which are inclined toward the lower part 21. Such a form facilitates the escape of air toward the top through column 28 and avoids, as a result, the development of bacterial deposits.

This application relates to subject matter disclosed in French Application number 94 00342, filed on Jan. 10, 1994, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. Apparatus for filtering liquids, said apparatus comprising:

a base;

a reservoir mounted on said base for storing the liquid to be filtered;

liquid pumping means operatively associated with said reservoir;

filter means mounted on said base, said filter means having a lower portion and an upper portion located above said lower portion, said filter means being coupled to said pumping means so that liquid supplied by said pumping means circulates upwardly through said filter means from said lower portion to said upper portion;

dispensing means coupled to said filter means for dispensing filtered liquid; and a one-way valve connected upstream of said filter means, with respect to the direction of liquid flow in said apparatus, and operable, when said pumping means are not in operation, to maintain said filter means in permanent contact with liquid previously supplied by said pumping means.

2. Apparatus as defined in claim 1 wherein said valve is movable between an open condition and a closed condition by elastic deformation.

3. Apparatus as defined in claim 1 further comprising a flow tube connected between said liquid pumping means and said filter means, and wherein said valve is associated with said flow tube and is elastically movable between a rest position in which said tube is blocked in a liquid-tight manner when said pumping means are not in operation, and an open position in which said tube is unblocked when said pumping means are in operation.

4. Apparatus according to claim 1 wherein said filter means have an inlet for liquid to be filtered and said valve is mounted in said inlet.

5. Apparatus as defined in claim 1 wherein said valve comprises two lip portions delimiting a slit, said lip portions being elastically deformable and being pressed against one another to prevent flow of liquid through said slit when said lips are in a rest position.

6. Apparatus as defined in claim 5 wherein said valve comprises a substantially cylindrical main body forming a liquid inlet chamber and located upstream of said slit, with respect to the direction of liquid flow in said apparatus.

7. Apparatus according to claim 1 wherein said filter means comprises a liquid decantation chamber forming said lower portion of said filter means, and said valve is mounted in said decantation chamber.

8. Apparatus as defined in claim 7 wherein said decantation chamber is provided with a central well in which said valve is disposed.

9. Apparatus as defined in claim 1 wherein said reservoir is removable from said base.

10. Apparatus as defined in claim 1 further comprising a main housing, wherein said filter means are constituted by a filtering cartridge mounted in a removable manner on said housing.

11. Apparatus as defined in claim 10 wherein said cartridge comprises a cover having an opening for passage of filtered liquid from said upper portion of said filter means.

12. Apparatus as defined in claim 10 wherein said cartridge contains a quantity of polyphosphate beads constituting means for removing minerals from the liquid.

13. Apparatus as defined in claim 1 wherein said filter means are constituted by a filtering cartridge having a bottom and a top, said cartridge containing, from the bottom to the top, a lower filter plate, a mass of filtering material composed of a mixture of activated carbon and ion exchange resin, and an upper filter plate.

14. Apparatus as defined in claim 13 wherein said cartridge further contains a foam material filter interposed between said mass of filtering material and said upper filter plate.

15. Apparatus as defined in claim 1 wherein said filter means are oriented to define a substantially vertical liquid flow path.

16. Apparatus as defined in claim 1 wherein said dispensing means comprise a dispensing cap mounted on said filter means and orientable relative to said filter means, and a dispensing tube carried by said cap.

17. Apparatus according to claim 16 wherein said filter means comprise a filter cartridge and said dispensing cap is mounted on said filter cartridge in a manner to be orientable with respect to said filter cartridge.

18. Apparatus as defined in claim 1 wherein said valve is operable to maintain the entirety of said filter means in permanent contact with liquid.

19. In an apparatus for filtering liquids, said apparatus comprising:

a base;

a reservoir mounted on said base for storing the liquid to be filtered;

liquid pumping means operatively associated with said reservoir;

filter means mounted on said base, said filter means having a lower portion and an upper portion located above said lower portion, said filter means being coupled to said pumping means so that liquid supplied by said pumping means circulates upwardly through said filter means from said lower portion to said upper portion; and dispensing means coupled to said filter means for dispensing filtered liquid;

the improvement comprising a one-way valve connected upstream of said filter means, with respect to the direction of liquid flow in said apparatus, said valve having an open condition and a closed condition and operable to adopt the open condition in response to operation of said pumping means for supply of liquid through the filter means and to adopt said closed condition when said pumping means is not in operation, to maintain said filter means in permanent contact with liquid previously supplied by said pumping means.

20. Apparatus as defined in claim 19 wherein said valve is operable to maintain the entirety of said filter means in permanent contact with liquid.

* * * * *